No. 723,492. PATENTED MAR. 24, 1903.
G. A. SCHENCK.
POLE AND SHAFT.
APPLICATION FILED JAN. 12, 1903.
NO MODEL.
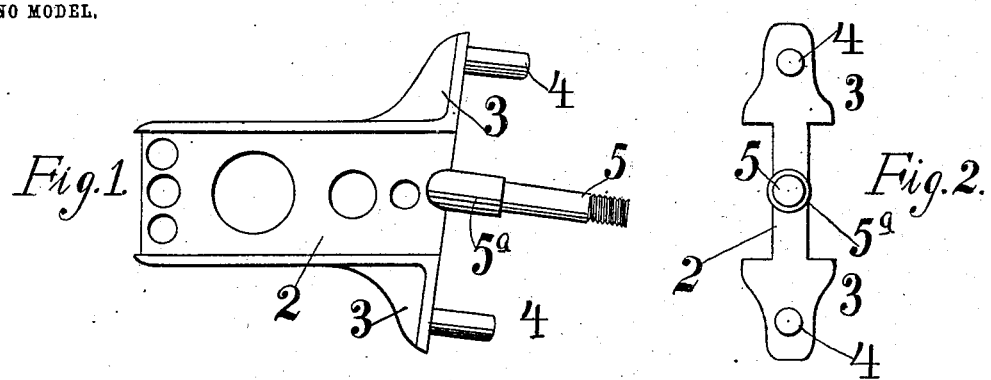
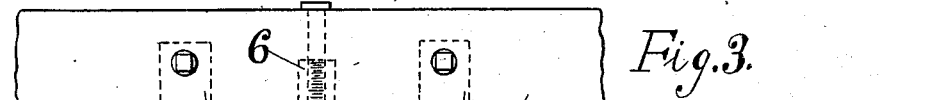
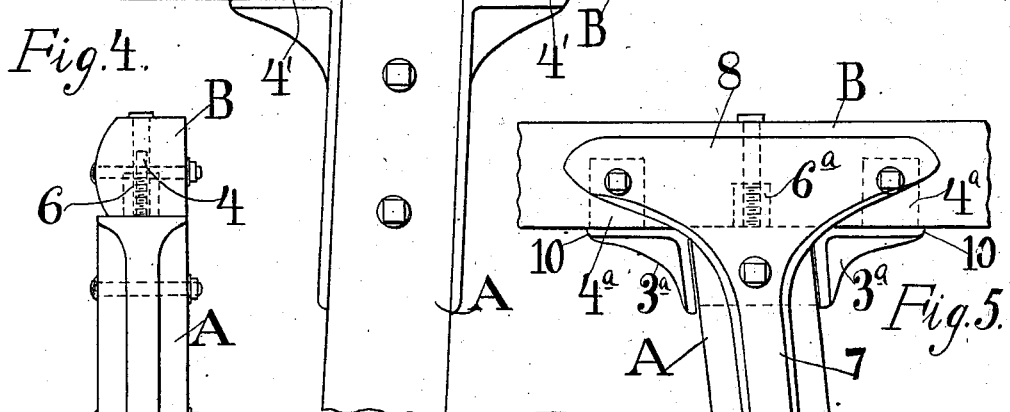
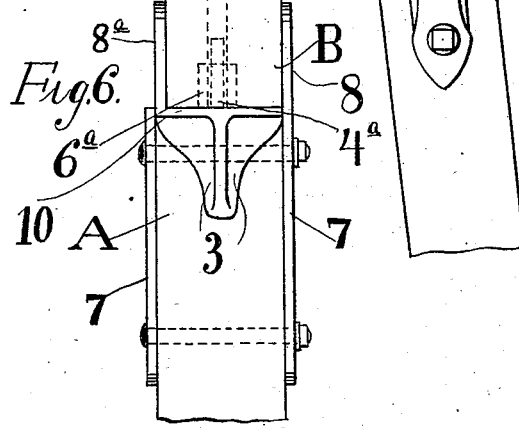
WITNESSES: John Oller.
INVENTOR.
George A. Schenck
BY Dewey Strong & Co.
ATTORNEY.

UNITED STATES PATENT OFFICE.

GEORGE AUSTIN SCHENCK, OF SAN FRANCISCO, CALIFORNIA, ASSIGNOR TO HOOKER & CO., OF SAN FRANCISCO, CALIFORNIA, A FIRM.

POLE AND SHAFT.

SPECIFICATION forming part of Letters Patent No. 723,492, dated March 24, 1903.

Application filed January 12, 1903. Serial No. 138,644. (No model.)

*To all whom it may concern:*

Be it known that I, GEORGE AUSTIN SCHENCK, a citizen of the United States, residing in the city and county of San Francisco, State of California, have invented an Improvement in Poles and Shafts; and I hereby declare the following to be a full, clear, and exact description of the same.

My invention relates to improvements in metal connections for shafts and cross-bars. Its object is to provide a cheap, rigid, and durable connection and one which will permit shafts to be knocked down to economize space in shipping.

It consists of the parts and the construction and combination of parts as hereinafter more fully described, having reference to the accompanying drawings, in which—

Figure 1 is a view of one form of my device. Fig. 2 is an end view of the same. Fig. 3 shows a modification of my device in position upon the shaft and cross-bar. Fig. 4 is an end view of same. Fig. 5 is a top view of a modified form. Fig. 6 is an end view of same.

A represents an ordinary shaft or thill, and B the usual cross-bar. 2 is a casting connecting these parts, and my invention resides in its peculiarities of construction.

In Fig. 1 I have have shown one form of my device wherein the casting comprises a web portion adapted to fit a slot in the end of the cross-bar and to be bolted thereto and having lateral lug portions 3 to bear upon the shaft. Integral with the casting are the dowel projections 4 and the bolt 5, by which the cross-bar may be rigidly connected to the shaft. The dowels, which may be round or flat, as shown in Figs. 1 to 3, seat in mortises in the shaft and prevent the parts twisting. The bolt 5, it will be noted, is made with a thickened base portion $5^a$, affording a reinforcement where most needed and obviating the likelihood of a bolt being twisted off when undue strain is brought on the parts. A small bolt of uniform diameter would be impracticable, for it would be liable to break at the point where it joins the casting. Too large a bolt, on the other hand, is undesirable, because it weakens the shaft needlessly. With this bolt a small hole sufficient to admit the smaller threaded portion of the bolt is bored in the shaft, and the cross-bar end of the hole so bored is enlarged to receive the shoulder portion $5^a$. When a nut is screwed on the bolt, the cross-bar and shaft may be drawn together tight to form an extremely rigid connection. The further advantage of this casting is its cheapness.

If desired, the casting may be modified whereby the nut will be made integral with it, as in Fig. 3 and indicated at 6, in which case a polygonal-headed bolt is used, giving a neat compact appearance when the cross-bar is secured to the shaft. The same figure, 3, shows the employment of flattened dowels 4' with transversely-elongated perforations to insure registry when boring the holes in the shaft after the dowels are inserted in their mortises. Bolts are then passed through the shaft, dowels, and shaft-iron to give an attachment in addition to the bolt 5 or its equivalent.

Where a casting of greater strength is needed than either of the foregoing, I employ a form (shown in Fig. 5) in which the perforated flattened lugs $4^a$ and nut $6^a$ are retained, but in which the web portion is reduced in size, while in addition thereto are two parallel separated plates having each a portion 7, adapted to embrace and be bolted to the top and bottom of the cross-bar, and portion 8 $8^a$, continuous with parts 7 and forming respective top and bottom supports for a shaft. The plates are transversely connected by a diaphragm portion 10, of which the lugs $3^a$ are extensions. The web, lugs, dowels, nut, and parts 7 and 8 $8^a$ are all cast in one integral structure. The parts 8 $8^a$ are perforated coincidently with the perforations in the dowels to receive bolts. The bottom plate $8^a$ is offset from its corresponding part 7 and is intended to be countersunk in the shaft, so that when the shaft-iron is bolted on the latter will rest on the bottom plate 8 flush with the surface of the shaft and the said corresponding part 7.

It is obvious that I may substitute in the last-described structure the integral bolt feature of Fig. 1 for the nut $6^a$ shown, and I wish to be able to group the various elements and forms thereof specified in such manner as may appear best suited in any particular case.

Having thus described my invention, what I claim, and desire to secure by Letters Patent, is—

1. A cross-bar and shaft connection, comprising a casting adapted to be secured to a cross-bar and having dowel projections and shaft-locking means integral with it and lying substantially parallel with the dowel projections and extending through the shaft, substantially as described.

2. The combination with the cross-bar and shafts, of a casting secured to the cross-bar and having lateral lugs bearing upon the shaft, dowels integral with said lugs fitting mortises in the shaft and a bolt integral with the casting extending through the shaft and threaded to receive a nut.

3. The combination with the cross-bar and shafts, of a casting having upper and lower plates between which the cross-bar and shafts are clamped, a diaphragm rigidly connecting said plates, extensions on said diaphragm and dowel projections integral with said extensions fitting mortises in the shafts.

4. The combination with the cross-bar and shafts, of a casting secured to the cross-bar, upper and lower plates integral with the casting and between which the shaft is held, dowels integral with the casting and disposed intermediate of said plates, and a bolt intermediate of and parallel with the dowel and extending through the cross-bar, said dowels and plates having coincident perforations.

In witness whereof I have hereunto set my hand.

GEORGE AUSTIN SCHENCK.

Witnesses:
S. H. NOURSE,
D. B. RICHARDS.